United States Patent
Rosen et al.

(10) Patent No.: US 9,665,233 B2
(45) Date of Patent: May 30, 2017

(54) VISUALIZATION OF SOFTWARE MEMORY USAGE

(71) Applicant: The University of Utah Research Foundation, Salt Lake City, UT (US)

(72) Inventors: Paul Rosen, Salt Lake City, UT (US); A. N. M. Imroz Choudhury, Salt Lake City, UT (US)

(73) Assignee: The University Utah Research Foundation, Salt Lake City, UT (US)

( * ) Notice: Subject to any disclaimer, the term of this patent is extended or adjusted under 35 U.S.C. 154(b) by 723 days.

(21) Appl. No.: 13/768,410

(22) Filed: Feb. 15, 2013

(65) Prior Publication Data
US 2013/0219328 A1    Aug. 22, 2013

Related U.S. Application Data

(60) Provisional application No. 61/599,545, filed on Feb. 16, 2012.

(51) Int. Cl.
*G06F 3/0481* (2013.01)
*G06F 11/32* (2006.01)
*G06F 11/34* (2006.01)

(52) U.S. Cl.
CPC .......... *G06F 3/0481* (2013.01); *G06F 11/323* (2013.01); *G06F 11/3414* (2013.01); *G06F 2201/885* (2013.01)

(58) Field of Classification Search
CPC ............... G06F 11/323; G06F 11/3414; G06F 2201/885; G06F 3/0481
USPC .................. 715/736, 781, 859; 711/118–122
See application file for complete search history.

(56) References Cited

U.S. PATENT DOCUMENTS

| | | | | |
|---|---|---|---|---|
| 5,313,567 A | * | 5/1994 | Civanlar | G06T 17/00 345/419 |
| 7,240,364 B1 | * | 7/2007 | Branscomb et al. | 726/9 |
| 7,519,542 B1 | * | 4/2009 | Waingold | 705/7.11 |
| 7,855,978 B2 | * | 12/2010 | Beaudoin | 715/853 |
| 7,882,312 B2 | * | 2/2011 | Spencer | 711/163 |
| 2003/0033480 A1 | * | 2/2003 | Jeremiassen | G06F 8/4442 711/118 |

(Continued)

OTHER PUBLICATIONS

Choudhury et al. Interactive visualization for memory reference traces, Computer Graphics Forum, 27 (2008), pp. 815-822.*

(Continued)

*Primary Examiner* — Amy M Levy
(74) *Attorney, Agent, or Firm* — Bell & Manning, LLC

(57) ABSTRACT

A system, computer-readable medium, and method of visualizing memory utilization by a computing device are provided. In the method, a user interface window is presented in a display. The user interface window includes a first indicator representing a first datum stored in a first memory and a second indicator representing a second datum stored in a second memory. A first access speed for accessing the first memory is faster than a second access speed for accessing the second memory. A determination is made that the second datum is not stored in the first memory, but is ready for access by the processor from the first memory. In response, an update to the user interface window is presented in the display including a line connecting a first location of the first indicator with a second location of the second indicator.

18 Claims, 14 Drawing Sheets

(56) References Cited

U.S. PATENT DOCUMENTS

| | | | | |
|---|---|---|---|---|
| 2005/0093867 | A1* | 5/2005 | Bobrow | G06F 11/323 345/440 |
| 2006/0259695 | A1* | 11/2006 | Sohm | G06F 11/3648 711/122 |
| 2008/0092121 | A1* | 4/2008 | DeRose | G06F 11/3409 717/125 |
| 2008/0301717 | A1* | 12/2008 | Chilimbi | G06F 11/3664 719/329 |
| 2009/0055594 | A1* | 2/2009 | Berg | G06F 11/3447 711/136 |
| 2010/0180245 | A1* | 7/2010 | Rutten | G06F 11/323 716/113 |
| 2012/0072887 | A1* | 3/2012 | Basak | G06F 11/323 717/123 |
| 2012/0222017 | A1* | 8/2012 | Hinkle | G06F 11/30 717/130 |
| 2013/0232452 | A1* | 9/2013 | Krajec | G06F 3/0482 715/840 |

OTHER PUBLICATIONS

Choudhury et al. Abstract visualization of runtime memory behavior, Proc. 6th IEEE Int Workshop on Visualizing Software for Understanding and Analysis, (2011). Presented Jul. 8, 2011.*

Choudhury et al. Topological analysis and visualization of cyclical behavior in memory reference traces, in Proceedings of IEEE Pacific Visualization 2012, Feb. 2012.*

Choudhury, ANM Imroz. Visualizing program memory behavior using memory reference traces. Dissertation submitted to University of Utah, Computer Science. Aug. 2012. Retrieved from [http://content.lib.utah.edu/utils/getfile/collection/etd3/id/1100/filename/1107.pdf] on [Oct. 16, 2015]. 158 pages.*

Draper et al. A Survey of Radial Methods for Information Visualization. IEEE Transactions on Visualization and Computer Graphics, vol. 15, No. 5, Sep./Oct. 2009. pp. 759-776.*

Terpstra et al. Collecting performance data with PAPI-C, Tools for High Performance Computing 2009, Springer Berlin Heidelberg, 2010, pp. 157-173.

Nagel et al., VAMPIR: Visualization and Analysis of MPI Resources, Supercomputer 63, vol. XII, No. 1, Jan. 1996, pp. 69-80.

Shende et al., The TAU Parallel Performance System, The International Journal of High Performance Computing Applications, vol. 20, No. 2, Summer 2006, pp. 287-311.

Stolte et al., Visualizing Application Behavior on Superscalar Processors, Proceedings 1999 IEEE Symposium on Information Visualization, 1999.

Aftandilian et al., Heapviz: Interactive Heap Visualization for Program Understanding and Debugging, SOFTVIS'10, Oct. 25-26, 2010, Salt Lake City, Utah.

Deijl et al., A Cache Visualization Tool, Computer, vol. 30, No. 7, Jul. 1997, pp. 71-78.

Weidendorfer et al., Sequential Performance Analysis with Callgrind and KCachegrind, Tools for High Performance Computing, 2008, Springer Berlin Heidelberg, pp. 93-113.

Yu et al., Visualizing the Impact of the Cache on Program Execution, Proceedings. Fifth International Conference on Information Visualisation, 2001, pp. 336-341.

Quaing et al., YACO: A User Conducted Visualization Tool for Supporting Cache Optimization, High Performance Computing and Communications, Lecture Notes in Computer Science, 2005, Springer Berlin Heidelberg, pp. 694-703.

Choudhury et al., Interactive Visualization for Memory Reference Traces, Eurographics/IEEE-VGTC Symposium on Visualization, 2008.

Grimsrud et al., Locality As a Visualization Tool, IEEE Transactions on Computers, vol. 45, No. 11, Nov. 1996, pp. 1319-1326.

Fry, Organic Information Design, 2000, Massachusetts Institute of Technology.

Ogawa, code swarm: A Design Study in Organic Software Visualization, IEEE Transactions on Visualization and Computer Graphics, vol. 15, No. 6, Nov. 2009, pp. 1097-1104.

Luk et al., Pin: Building Customized Program Analysis Tools with Dynamic Instrumentation, PLDI'05, Jun. 12-15, 2005, Chicago, Illinois.

Bardenhagen et al., The Generalized Interpolation Material Point Method, cmes, vol. 5, No. 6, 2004, pp. 477-495.

Choudhury et al, Abstract visualization of runtime memory behavior. In 6th IEEE International Workshop on Visualizing Software for Understanding and Analysis (VISSOFT 2011), pp. 22-29, Sep. 29, 2011.

* cited by examiner

```
18  void doubleCompare(const void *a, const void *b){
19      return *(const double *)a - *(const double *)b;
20  }
21
22  void bubbleSort(std::vector<double>& v){
23      for(int end=v.size()-1; 0 < end; end--){
24          for(int i=0; i<end; i++){
25              if(v[i] > v[i+1]){
26                  const double tmp = v[i];
27                  v[i] = v[i+1];
28                  v[i+1] = tmp;
29              }
30          }
31      }
32  }
33
34  void stoogeSort(std::vector<double>& v, unsigned a, unsigned b,
```

Fig. 5b

VISUALIZATION OF SOFTWARE MEMORY USAGE

CROSS-REFERENCE TO RELATED APPLICATIONS

The present application claims priority to U.S. Provisional Patent Application No. 61/599,545 that was filed Feb. 16, 2012, the entire contents of which is hereby incorporated by reference.

REFERENCE TO GOVERNMENT RIGHTS

This invention was made with government support under P41 RR12553 10 awarded by National Institutes of Health. The Government has certain rights in the invention.

BACKGROUND

The deficit between processor and memory speeds has been increasing at an exponential rate, due to a differing rate of improvement in their respective technologies. The primary mechanism for mitigating this diverging speed problem is the careful and efficient use of a cache, which works as fast temporary storage between main memory and the central processing unit (CPU) to reduce the average time to access memory. The cache is a smaller, faster memory that stores copies of data from the most frequently used main memory locations to reduce the average latency for memory accesses since cache latency is less than the latency associated with an access of main memory. When the processor needs to read from or write to a location in main memory, the processor first determines if a copy of that data is stored in the cache. If it is, the processor reads from or writes to the cache, which is much faster than reading from or writing to main memory. This is accomplished by comparing the address of the main memory location to all tags in the cache that might contain that address. If the processor finds that the main memory location is stored in the cache, a cache hit has occurred; otherwise, a cache miss has occurred. The proportion of accesses that result in a cache hit is called the hit rate and is a measure of the effectiveness of the cache for a given program or algorithm.

Of course, a cache has a finite size. Thus, to make room for a new entry when a cache miss occurs, the cache evicts an existing entry. The heuristic used to choose which entry to evict is called the replacement policy. The fundamental problem with any replacement policy is that it must predict which existing cache entry is least likely to be used in the future. Predicting the future is difficult, especially for hardware caches that use simple rules amenable to implementation in circuitry. One popular replacement policy replaces the least recently used entry. When the cache allocates a new entry, the tag and a copy of the data stored in main memory are saved in the evicted memory location. The reference can then be applied to the new entry just as in the case of a hit.

To lower the cache miss rate, a great deal of analysis has been done on cache behavior in an attempt to find the best combination of size, associativity, block size, and so on. One design issue is the fundamental tradeoff between cache latency and hit rate because, while a larger cache provides a better hit rate, a larger cache also results in a longer latency. To address this tradeoff, many computers use multiple levels of cache, with small fast caches backed up by larger successively slower caches. Thus, the cache can be organized into a hierarchy of cache levels such as a level 1 (L1) cache, a level 2 (L2) cache, a level 3 (L3) cache, etc. If there are multiple cache levels, the cache is checked in the hierarchical order in a similar manner to a single cache and main memory. Thus, the L1 cache is checked first. If the L1 cache misses, the L2 cache is checked, and so on, until the data item is ultimately pulled from main memory if not found in any of the cache levels. When misses occur, the data is copied from the lowest level cache in which the data item is found, which may be the main memory, to the L1 cache for use by the processor. Each successive cache level is generally larger, but slower than the last. In turn, each cache level is organized into cache blocks or lines which hold some specific, fixed number of bytes of information.

The interactions between modern hardware and software systems are increasingly complex which can result in unexpected interactions and behaviors that seriously affect software performance costing time and money. To address this issue, students and software engineers often spend a significant amount of their time understanding memory utilization performance and optimizing their software based on this understanding. One common performance analysis technique is to track cache activity within an application. This information is usually provided for very coarse time granularity. At best, cache performance is provided for blocks of code or individual functions. At worst, these results are captured for an entire application's execution. This provides only a global view of performance and limits the ability to intuitively understand software performance. An alternative to this coarse granularity is to generate a memory reference trace, which can then be run through a cache simulator to produce a fine-grained approximation of the software's actual cache performance.

The biggest challenge when using this approach is sifting through the volume of data produced. Even simple applications can produce millions of references, yet this data contains valuable information that needs to be extracted to better understand program performance. The use of statistical methods or averaging simply produces a coarse understanding of software performance, forgoing the detail available in the trace. Static analysis of memory behavior is also possible, but limited only to cases where program behavior can be deduced at compile time.

SUMMARY

In an example embodiment, a method for visualizing memory utilization by a computing device is provided. A user interface window is presented in a display. The user interface window includes a first indicator representing a first datum stored in a first memory and a second indicator representing a second datum stored in a second memory. A first access speed for accessing the first memory is faster than a second access speed for accessing the second memory. A determination is made that the second datum is not stored in the first memory, but is ready for access by the processor from the first memory. In response, an update to the user interface window is presented in the display including a line connecting a first location of the first indicator with a second location of the second indicator.

In another example embodiment, a computer-readable medium is provided having stored thereon computer-readable instructions that when executed by a processor, cause a computing device to perform the method of visualizing memory utilization by the computing device.

In yet another example embodiment, a system is provided. The system includes, but is not limited to, a processor and the computer-readable medium operably coupled to the processor. The computer-readable medium has instructions stored thereon that when executed by the processor, cause the system to perform the method of visualizing memory utilization by the system.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
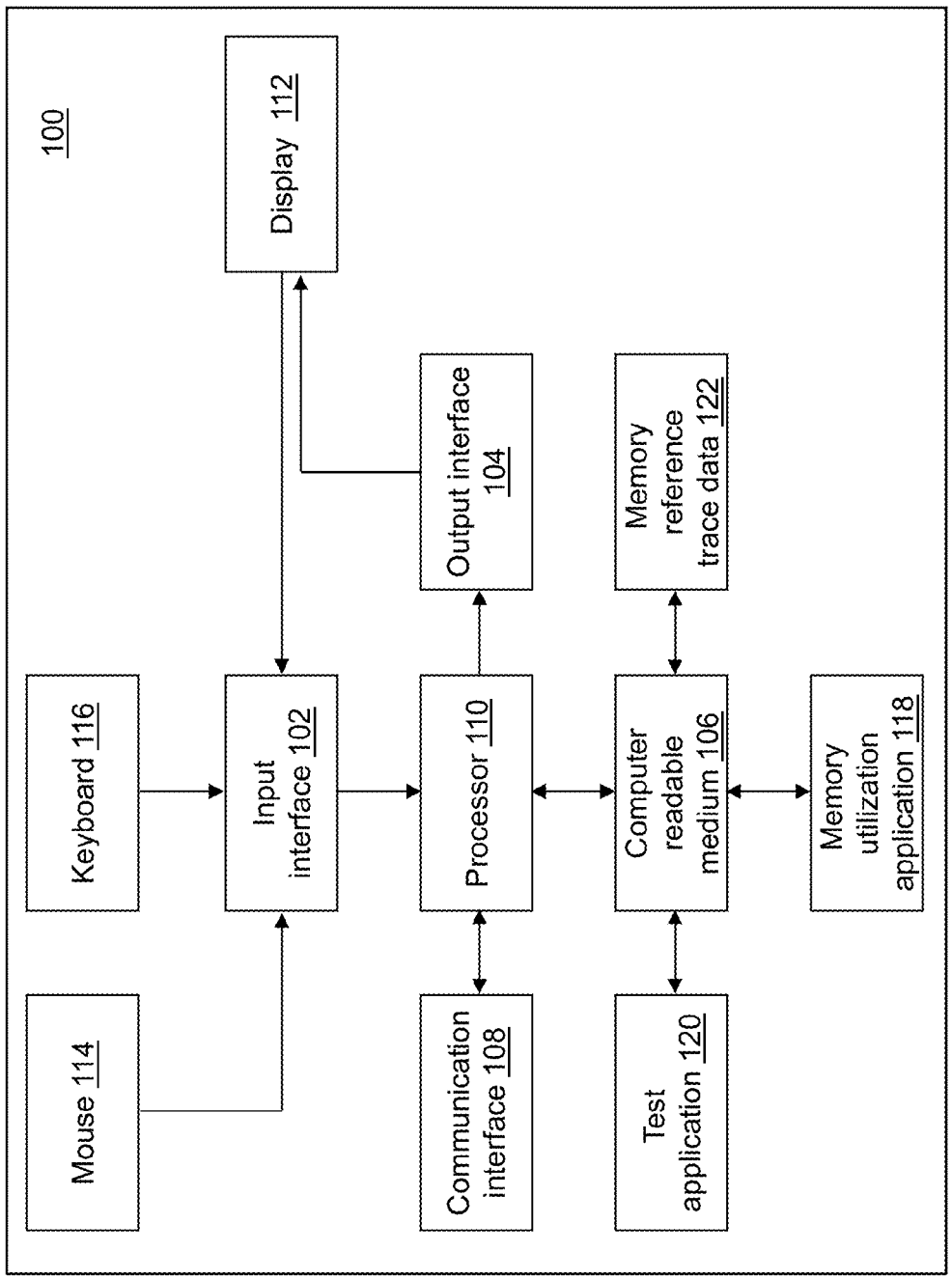
FIG. 1 depicts a block diagram of a computing device to visualize memory utilization by a test application in accordance with an illustrative embodiment.

With reference to FIG. 1, a block diagram of a computing device 100 is shown in accordance with an illustrative embodiment. Computing device 100 may include an input interface 102, an output interface 104, a computer-readable medium 106, a communication interface 108, a processor 110, a display 112, a mouse 114, a keyboard 116, a memory utilization application 118, a test application 120, and memory reference trace data 122. Different, fewer, and additional components may be incorporated into computing device 100. For example, computing device 100 may not include communication interface 108, mouse 114, and/or keyboard 116. computing device 100 may include a computer of any form factor such as a personal digital assistant, a desktop, a laptop, an integrated messaging device, a smart phone, etc.

Input interface 102 provides an interface for receiving information from the user for entry into computing device 100 as known to those skilled in the art. Input interface 102 may use various input technologies that provide an interface to display 112, mouse 114, keyboard 116, a pen and touch screen, a track ball, a touch screen, a keypad, one or more buttons, etc. to allow the user to enter information into computing device 100 or to make selections presented in a user interface displayed on display 112. The same interface may support both input interface 102 and output interface 104. For example, a touch screen both allows user input and presents output to the user. Computing device 100 may have one or more input interfaces that use the same or a different input interface technology.

Output interface 104 provides an interface for outputting information for review by a user of computing device 100. For example, output interface 104 may include an interface to display 112. Display 112 may be a thin film transistor display, a light emitting diode display, a liquid crystal display, a touch screen, or any of a variety of different displays known to those skilled in the art. Computing device 100 may have one or more output interfaces that use the same or a different interface technology. Input and/or output devices, such as display 112, mouse 114, keyboard 116, etc., further may be accessible to computing device 100 through communication interface 108.

Computer-readable medium 106 is an electronic holding place or storage for information so that the information can be accessed by processor 110 as known to those skilled in the art. Computer-readable medium 106 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., CD, DVD, . . . ), smart cards, flash memory devices, etc. Computing device 100 may have one or more computer-readable media that use the same or a different memory media technology. Computing device 100 also may have one or more drives that support the loading of a memory media such as a CD or DVD. Computer-readable medium 106 may provide the electronic storage medium for a database.

Computer-readable medium 106 can be organized into a hierarchy of cache levels such as a level 1 (L1) cache, a level 2 (L2) cache, a level 3 (L3) cache, etc. and a main memory in addition to other external memory such as a flash memory stored on a flash memory device. As stated previously, each successive cache level may be larger in size, but access of the memory in the successive cache level is slower. Each cache level may be organized into cache blocks or lines that hold a specific, fixed number of bytes of information. The information, for example, is a data item, or single datum, that is accessed (read/write) during execution of test application 120. The number of bytes of memory associated with the single datum may vary. For example, a double precision floating point data item may be saved using more bytes of memory than an integer data item. However, a specific set of bytes are associated with the specific data item denoted as a single datum. Computer-readable medium 106 is further used to store computer-readable and executable instructions in addition to data generated and/or used by execution of the instructions.

Communication interface 108 provides an interface for receiving and transmitting data between devices using various protocols, transmission technologies, and media as known to those skilled in the art. Communication interface 108 may support communication using various transmission media that may be wired or wireless. Computing device 100 may have one or more communication interfaces that use the same or a different communication interface technology. Data and messages may be transferred between computing device 100 and another device using communication interface 108. For example, communication interface 108 may provide access to an external computer-readable medium such as a database stored in another computing device.

Processor 110 executes instructions as known to those skilled in the art. Processor 110 may be implemented in hardware, such as a special purpose computer, logic circuits, or hardware circuits and/or in firmware. The term "execution" is the process of running an application or the carrying out of the operation called for by an instruction. The instructions may be written using one or more programming language, scripting language, assembly language, etc. Processor 110 executes an instruction, meaning that it performs/controls the operations called for by that instruction. Processor 110 operably couples with output interface 104, with input interface 102, with computer-readable medium 106, and with communication interface 108 to receive, to send, and to process information. Processor 110 may retrieve a set of instructions from a permanent memory device and copy the instructions in an executable form to a temporary memory device that is generally some form of RAM. Computing device 100 may include a plurality of processors that use the same or a different processing technology.

Memory utilization application 118 performs operations associated with simulating memory utilization by test application 120 during execution of test application 120 and with presenting a visual representation of that usage to a user on display 112. Some or all of the operations described herein may be embodied in memory utilization application 118. The operations may be implemented using hardware, firmware, software, or any combination of these methods. With reference to the example embodiment of FIG. 1, memory utilization application 118 is implemented in software (comprised of computer-readable and/or computer-executable instructions) stored in computer-readable medium 106 and accessible by processor 110 for execution of the instructions that embody the operations of memory utilization application 118. Memory utilization application 118 may be written using one or more programming languages, assembly languages, scripting languages, etc.

Test application 120 performs operations defining a computer implementable function. The operations may be implemented using hardware, firmware, software, or any combination of these methods. With reference to the example embodiment of FIG. 1, test application 120 is implemented in software (comprised of computer-readable and/or computer-executable instructions) stored in computer-readable medium 106 and accessible by processor 110 for execution of the instructions that embody the operations of memory utilization application 118. Test application 120 may be written using one or more programming languages, assembly languages, scripting languages, etc.

Memory reference trace data 122 is a sequence of records representing memory references generated during execution of test application 120. Each record comprises a code denoting the type of access ("R" for a read and "W" for a write) and the address at which the reference occurred. Memory reference trace data 122 may include all information about the interactions with memory during execution of test application 120. Thus, memory reference trace data 122 is created by executing test application 120, intercepting the load and store instructions executed by test application 120, decoding the instructions, and storing the resulting information as memory reference trace data 122 in computer-readable medium 106.

As understood by a person of skill in the art, a number of tools exist to generate memory reference trace data 122 during execution of test application 120. In an illustrative embodiment, memory reference trace data 122 includes lists of addresses accessed by test application 120 as it executes, together with a code indicating the type of transaction (i.e. read or write). In an illustrative embodiment, Pin, a dynamic binary rewriting infrastructure that allows for arbitrary code to be attached to any instruction at runtime is used to create memory reference trace data 122. Pin is described in a paper by Luk, Chi-Keung et al., titled *Pin: Building Customized Program Analysis Tools with Dynamic Instrumentation* and published by PLDI on Jun. 12-15, 2005 at pages 190-200, which is hereby incorporated by reference in its entirety. In creating memory reference trace data 122, each load or store instruction may be directed to trap to a recording function the read-write code and the effective address accessed. Debugging symbols in test application 120 may be used to record correlations of instructions to line numbers in source code to correlate memory activity to a source code context. Memory reference trace data 122 may be filtered to remove memory activity that is not of interest to a user of memory utilization application 118.

Figure 2:
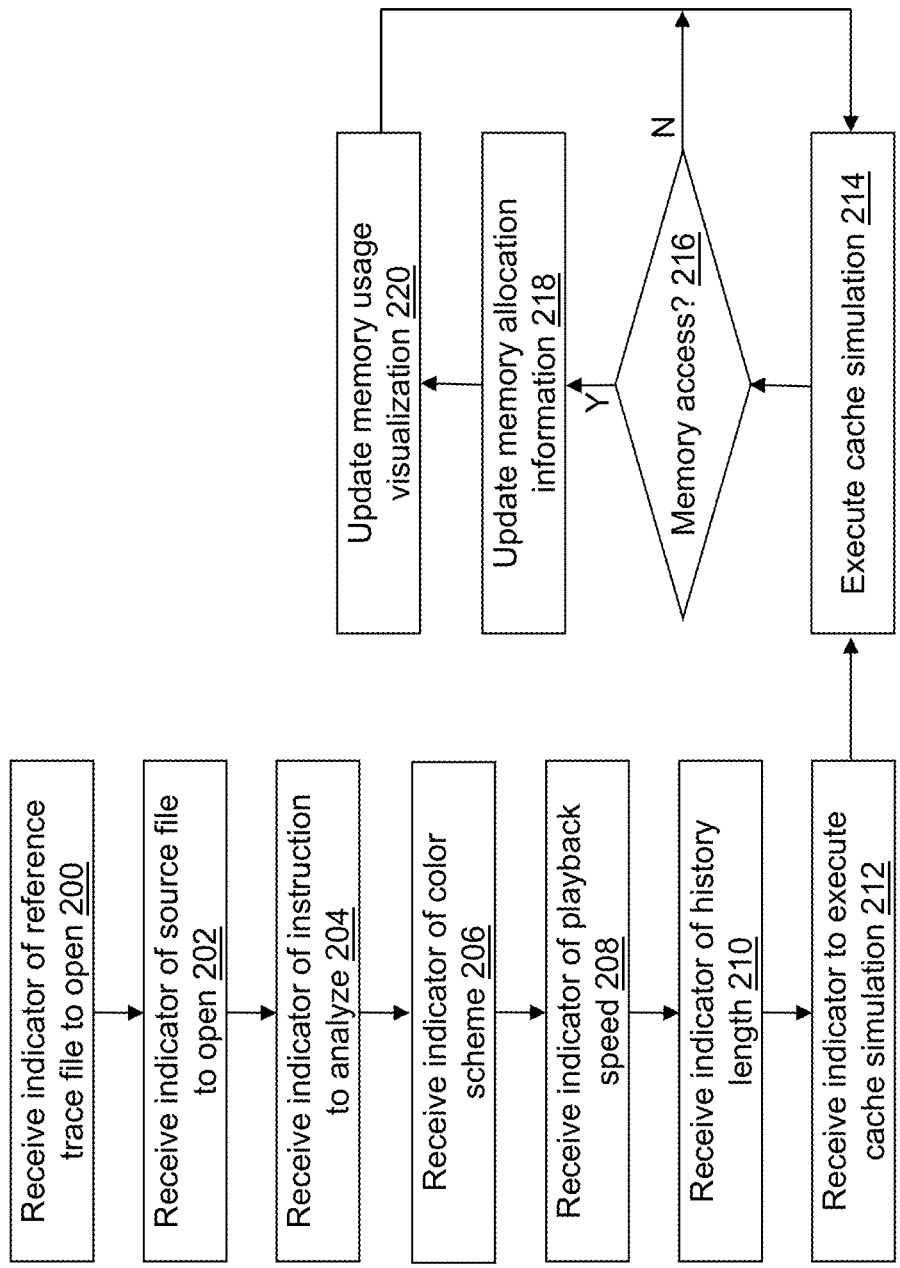
FIG. 2 depicts a flow diagram illustrating example operations performed by the computing device of FIG. 1 to provide visualization of the memory utilization by the test application in accordance with an illustrative embodiment.

With reference to FIG. 2, example operations associated with memory utilization application 118 are described. Additional, fewer, or different operations may be performed depending on the embodiment. The order of presentation of the operations of FIG. 2 is not intended to be limiting. A user can interact with one or more user interface windows presented to the user in display 112 under control of memory utilization application 118 in an order selectable by the user. Thus, although some of the operational flows are presented in sequence, the various operations may be performed in various repetitions, concurrently, and/or in other orders than those that are illustrated. A user may execute memory utilization application 118 which causes presentation of a user interface window, which may include a plurality of menus and selectors such as drop down menus, buttons, text boxes, hyperlinks, etc. associated with memory utilization application 118. Thus, as understood by a person of skill in the art, the user interface window is presented on display 112 under control of processor 110 executing memory utilization application 118. As the user interacts with memory utilization application 118, different user interface windows are presented to provide the user with additional functionality. As understood by a person of skill in the art, memory utilization application 118 receives an indicator associated with an interaction by the user with a user interface window presented under control of memory utilization application 118. Based on the received indicator, memory utilization application 118 performs one or more subsequent operations.

Figure 3:
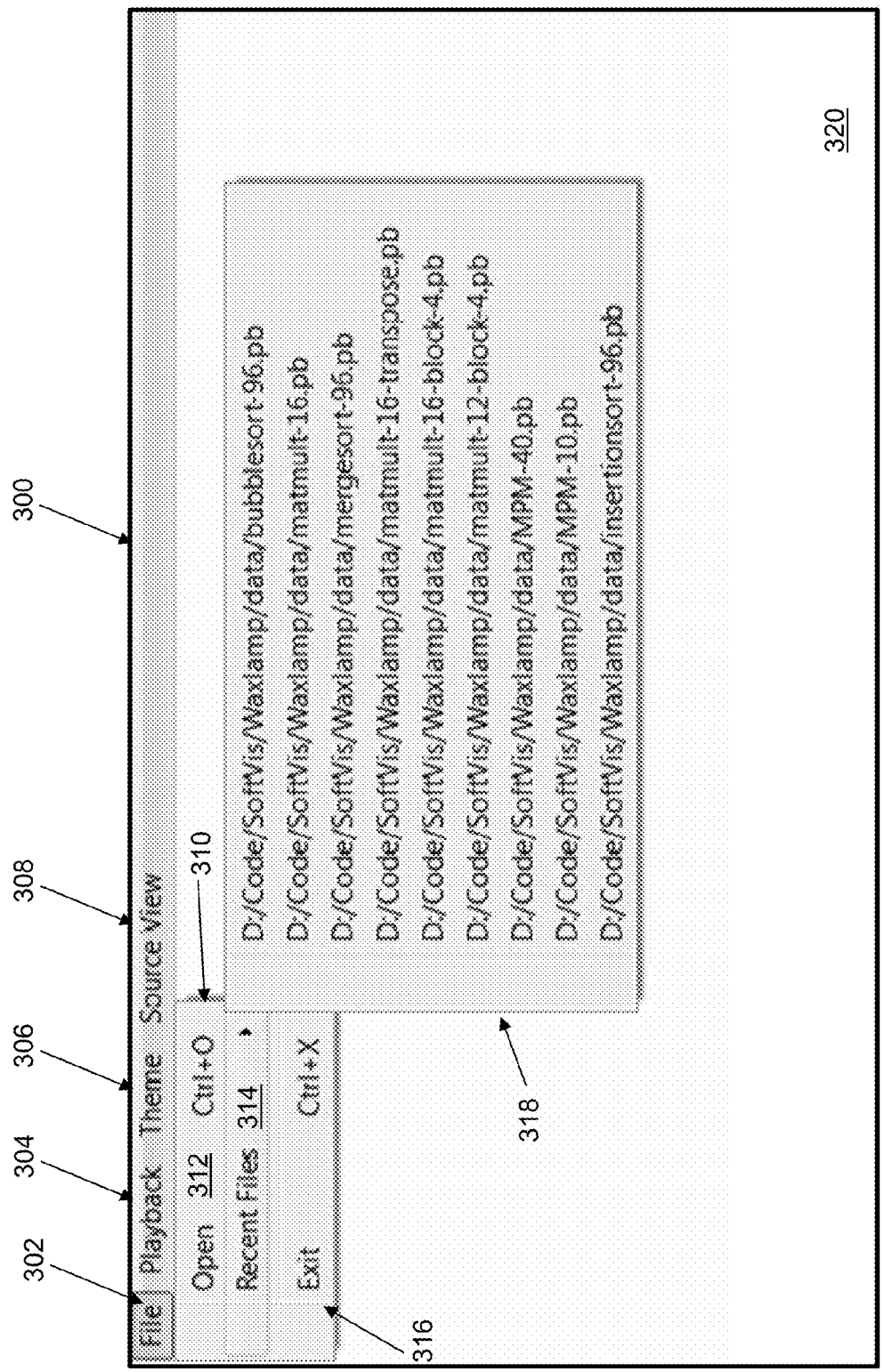
FIGS. 3-8 and 12 depict user interface windows created by execution of a memory utilization application to visualize memory utilization by the test application in accordance with an illustrative embodiment.

In an operation 200, a first indicator is received indicating that a user of memory utilization application 118 has selected a first selector identifying a reference trace data file to open. The reference trace data file contains memory reference trace data 122. As an example, with reference to FIG. 3, a portion of a first user interface window 300 is shown in accordance with an illustrative embodiment. First user interface window 300 may include a plurality of selectors and a visualization window 320. A selector of the plurality of selectors may be associated with a menu. For example, the plurality of selectors of first user interface window 300 may include a file selector 302, a playback selector 304, a theme selector 306, and a source view selector 308. With reference to FIG. 3, file selector 302 is selected. For example, the user may use mouse 114 to scroll to file selector 302. Scrolling to file selector 302 may cause presentation of a second user interface window 310 that may include a second plurality of selectors.

The second plurality of selectors may include an open file selector 312, a recent file selector 314, and an exit selector 316. Scrolling to recent file selector 314 may cause presentation of a third user interface window 318 that may include a third plurality of selectors. The third plurality of selectors may include a list of one or more reference trace data files that have been opened most recently by a user using memory utilization application 118. Selection of open file selector 312 may cause presentation of a fourth user interface window (not shown) that allows a user to locate a reference trace data file to open in a file system as understood by a person of skill in the art. In response to a selection of a reference trace data file listed in third user interface window 318 or located using the fourth user interface window, memory utilization application 118 receives the first indicator indicating the selection and reads the selected file into a main memory of computer-readable medium 106. Selection of exit selector 316 may cause memory utilization application 118 to stop executing and close first user interface window 300.

Figure 4:
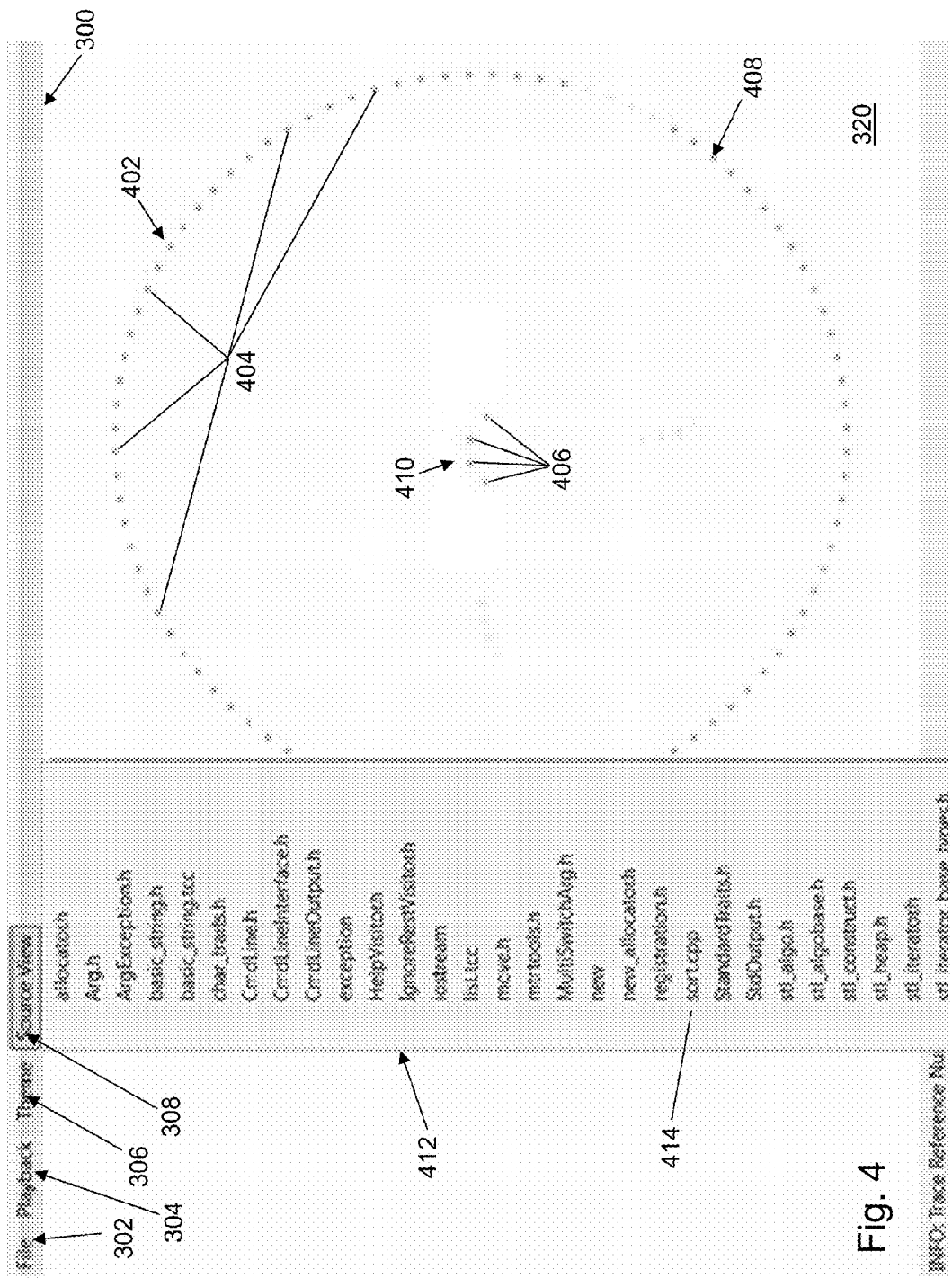

After opening the selected reference trace data file, memory utilization application 118 may update visualization window 320 to include a memory utilization graphic 402. Memory utilization graphic 402 may include a first plurality of point glyphs 404 and a second plurality of point glyphs 406 that each represents a memory location for a data item. Different levels of memory used by test application 120 may be represented by concentric rings. For example, with reference to FIG. 4, a main memory is represented by the first plurality of point glyphs 404 which form an outer ring 408, and a L1 cache memory is represented by the second plurality of point glyphs 406 which form an innermost ring 410. Additional rings may be added between innermost ring 410 and outer ring 408 representing additional levels of cache having a hierarchical access speed from fastest being closest to innermost ring 410 and successively slower caches being successively closer to outer ring 408. Within each ring, the associated plurality of point glyphs may be arranged to form a variety of shapes. An individual point glyph of the plurality of point glyphs represents an addressable piece of memory of the associated memory type (L1 cache, L2 cache, L3 cache, main memory, etc.).

In an operation 202, a second indicator is received indicating that the user of memory utilization application 118 has selected a second selector identifying a source file to open. The opened reference trace data file may include information describing one or more source files associated with test application 120 or a pointer to another file that contains such information. For example, with reference to FIG. 4, a fifth user interface window 412 is shown in accordance with an illustrative embodiment when a user scrolls over or otherwise selects source view selector 308. Fifth user interface window 412 may include a plurality of selectors with each selection of the plurality of selectors associated with a source file of test application 120 identified using information stored in the opened reference trace data file. For example, the user may scroll down to select a specific source file to open such as a source file named "sort.cpp" indicated by a file selector 414.

Figure 5A:
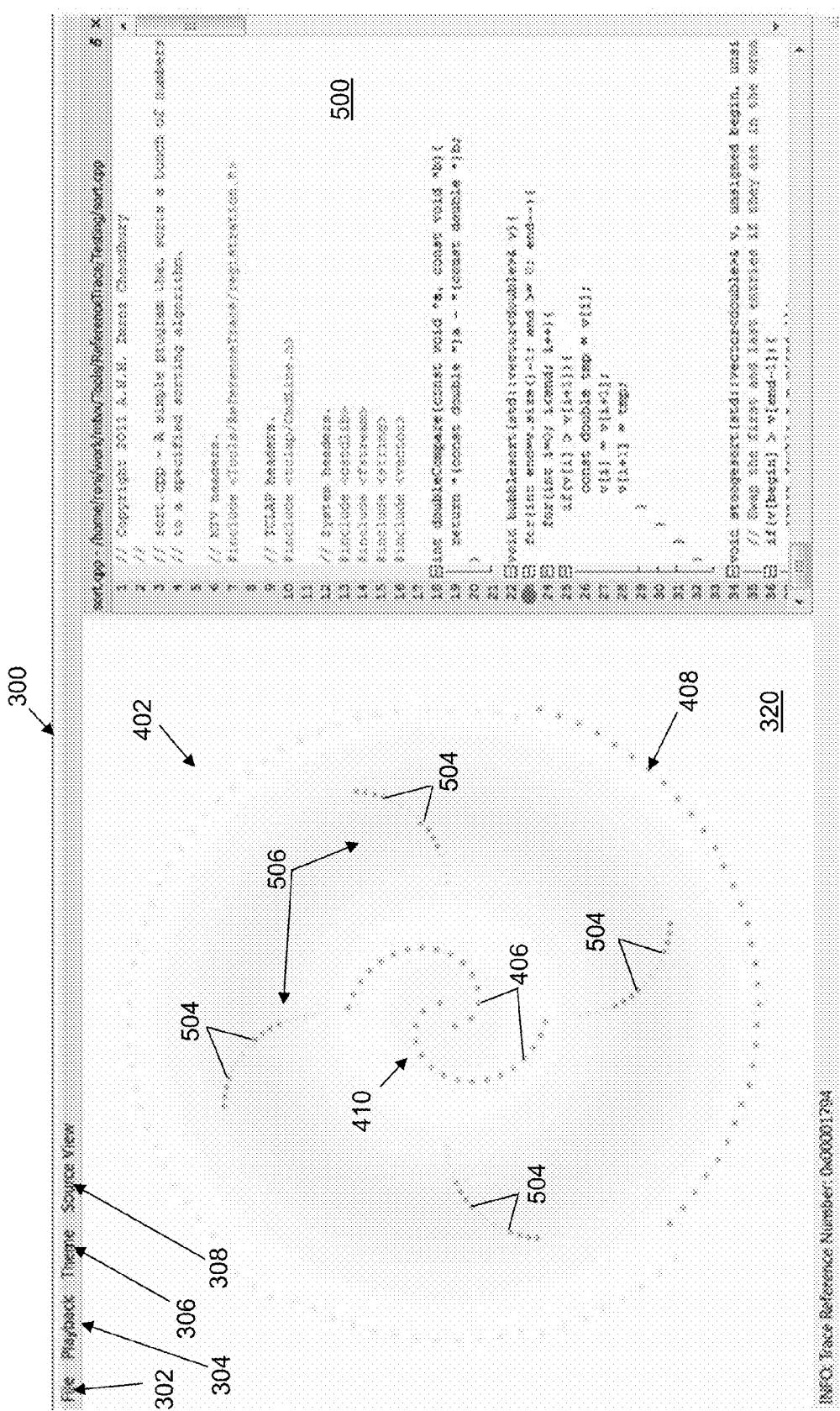

After selection of file selector 414 by the user, memory utilization application 118 receives an indicator indicating the selection of the source file named "sort.cpp". In response, memory utilization application 118 may update first user interface window 300 to include a source file window 500 as shown with reference to FIG. 5*a* in accordance with an illustrative embodiment. Source file window 500 presents the instructions included in the selected source file. With reference to FIG. 5*b*, a portion of source file window 500 is shown enlarged for legibility. The user may scroll through the presented instructions and select an instruction for which the memory utilization is to be analyzed. In an operation 204, a third indicator is received indicating that the user of memory utilization application 118 has selected the instruction for which the memory utilization is to be analyzed. In response, memory utilization application 118 provides an instruction indicator 502 that identifies the selected instruction to the user for reference.

With continuing reference to FIG. 5*a*, memory utilization graphic 402 has been updated to show additional glyphs of the second plurality of point glyphs 406 and to show a third plurality of point glyphs 504 which form a first intermediate ring 506. A L2 cache memory is represented by the third plurality of point glyphs 504, which form first intermediate ring 506. Additional rings may be added between first intermediate ring 506 and outer ring 408 representing additional levels of cache. In the illustrative embodiment, the associated plurality of point glyphs are arranged to form arcs within each ring. For example, the second plurality of point glyphs 406 of innermost ring 410 are arranged to form two arcs with each arc starting near a center of memory utilization graphic 402 and forming a spiral within innermost ring 410, and the third plurality of point glyphs 504 of first intermediate ring 506 are arranged to form four arcs with each arc starting near the inner edge of first intermediate ring 506 and arcing towards the outer edge of first intermediate ring 506. Of course, depending on the configuration of the L1 cache memory and the L2 cache memory of the computing device being simulated, additional or fewer arcs and/or spirals may be used to represent each cache level. The computing device being simulated may be computing device 100 or another computing device. Memory utilization application 118 may provide a user interface window that allows the user to select or define the memory layout to be simulated or the memory layout parameters may be defined in the selected reference trace data file during execution of test application 120.

In an illustrative embodiment, lighter-colored glyphs are placed in the higher levels of cache and the main memory region to indicate duplication of data through the levels of the memory hierarchy. As memory locations are referenced, the glyph associated with the memory location moves to the center of memory utilization graphic 402, and as they age and are eventually evicted, the glyph associated with the memory location is pushed out towards the next concentric ring.

Figure 6:
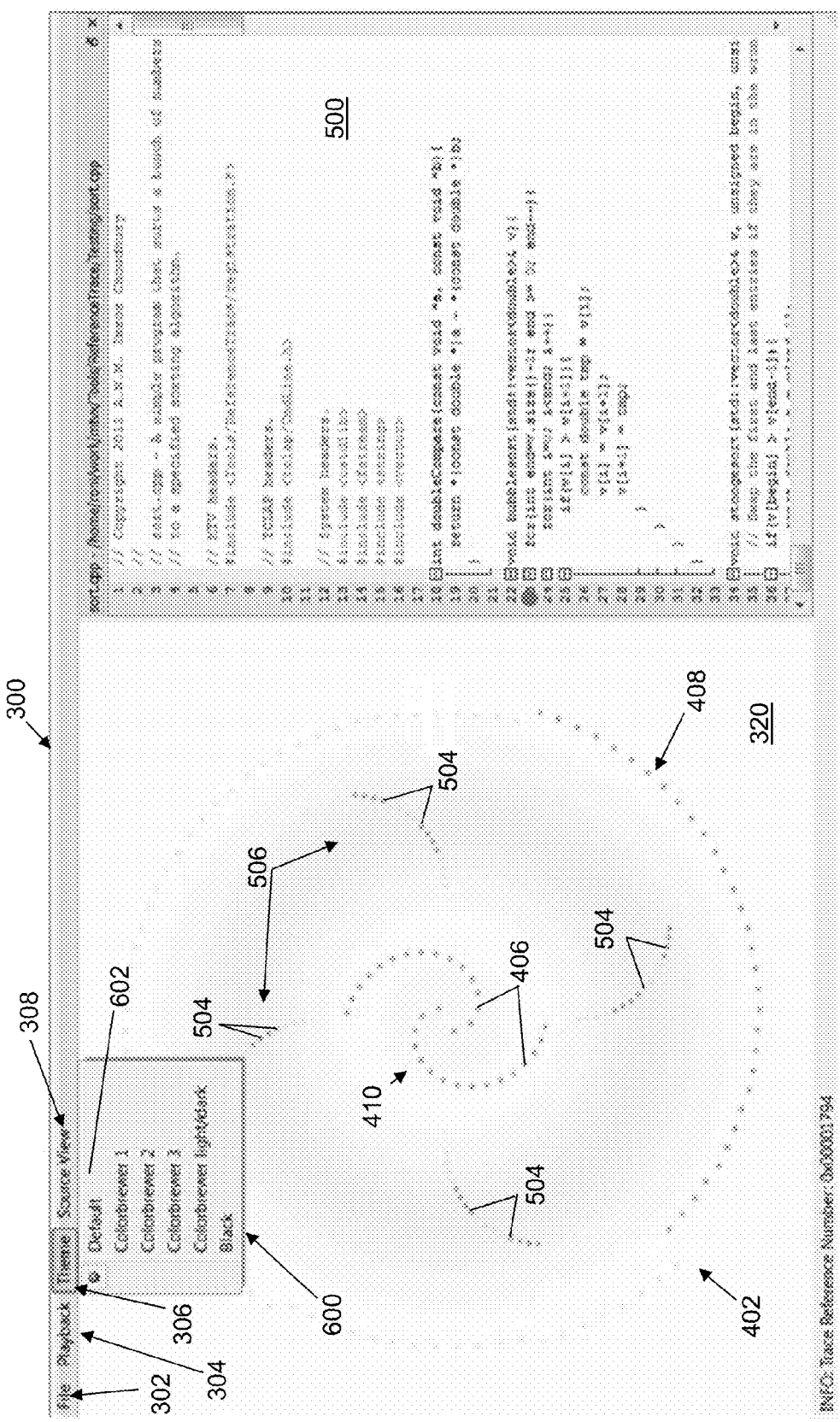

In an operation 206, a fourth indicator is received indicating that the user of memory utilization application 118 has selected a color scheme to be used in forming memory utilization graphic 402. For example, with reference to FIG. 6, a sixth user interface window 600 is shown in accordance with an illustrative embodiment when a user scrolls over or otherwise selects theme selector 306. Sixth user interface window 600 may include a plurality of selectors with each selection of the plurality of selectors associated with a color scheme. A "default" color scheme may be predefined and applied to create memory utilization graphic 402 unless and until the user selects a different color scheme. For example, a "default" color scheme selector 602 is included in the plurality of selectors presented in sixth user interface window 600. The user may scroll down to select a different color scheme. Each color scheme defines the colors used in memory utilization graphic 402 to indicate different events. As understood by a person of skill in the art, the user may be provided with the capability to define their own custom color scheme by being provided with a list of event types and selecting a color associated with each event type.

Figure 7:
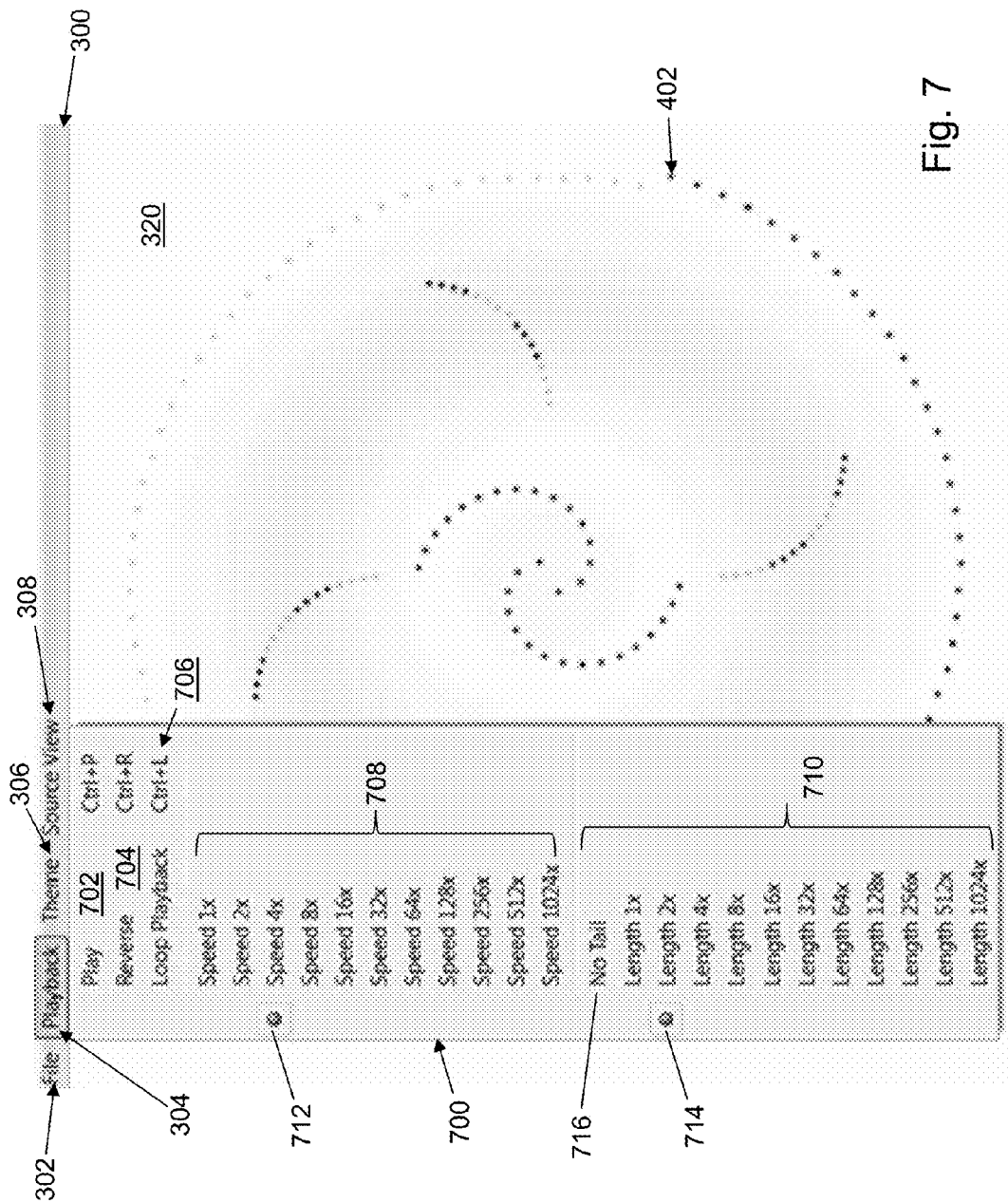

In an operation 208, a fifth indicator is received indicating that the user of memory utilization application 118 has selected a playback speed to be used in forming memory utilization graphic 402. For example, with reference to FIG. 7, a seventh user interface window 700 is shown in accordance with an illustrative embodiment when a user scrolls over or otherwise selects playback selector 304. Seventh user interface window 700 may include a plurality of selectors with each selection of the plurality of selectors associated with controlling the playback and visualization of memory reference trace data 122. For example, seventh user interface window 700 may include a play selector 702, a reverse play selector 704, a loop playback selector 706, a plurality of speed selectors 708, and a plurality of tail length selectors 710. Selection of play selector 702 by the user causes execution by memory utilization application 118 of a cache simulation using memory reference trace data 122 and an update to memory utilization graphic 402 to reflect the memory utilization of test application 120 during its execution. Selection of reverse play selector 704 by the user causes execution by memory utilization application 118 of the cache simulation using memory reference trace data 122 and the update to memory utilization graphic 402 to reflect the memory utilization of test application 120 during its execution in reverse time sequence. Selection of loop playback selector 706 by the user causes repeated execution by memory utilization application 118 of the cache simulation using memory reference trace data 122 and the update to memory utilization graphic 402 to reflect the memory utilization of test application 120 during its execution.

The plurality of speed selectors 708 allow the user to select a processing speed multiplier for playback of the cache simulation. Memory reference trace data 122 can be very large; as such, the visualization produced from it can be intractably long to observe. One option is to speed up the visualization by increasing the speed of trace playback and glyph motion. This approach is acceptable until the speed becomes so high that glyph motion is no longer visible. Another option is to compress several time steps into a single animation frame, encoding the changes in glyph positions through time by using path lines. The fast forward speed is selected by the user using the plurality of speed selectors 708 and indicates the number of animation frames to skip when updating memory utilization graphic 402. The positions of glyphs are calculated for the skipped frames, and a path line is used to connect the glyph positions at the intermediate times. When the time compressed frames are played at a normal speed, simulation time appears to have sped up dramatically, yet the path lines keep the sense of evolving time coherent.

A "default" playback speed may be predefined and applied to execution of the cache simulation and to the update of memory utilization graphic 402 unless and until the user selects a different playback speed. For example, a "default" playback speed selector 712 of four times the execution speed is included in the plurality of speed selectors 708 presented in seventh user interface window 700. The user may scroll up or down to select a faster or slower playback speed. Any number of playback speeds may be user selectable. Additionally, other methods for selecting the playback speed may be used. For example, a drop down box or data entry box may be used to allow the user to select a playback speed as understood by a person of skill in the art.

In an operation 210, a sixth indicator is received indicating that the user of memory utilization application 118 has selected a history length to be used in forming memory utilization graphic 402. The plurality of tail length selectors 710 allow the user to select a history length to present during playback and visualization of the cache simulation. Using the plurality of tail length selectors 710, the path lines can be controllably extended further into the past history as desired. Increasing the tail length shows more past events, but also tends to obscure individual events. Transparency in the path lines indicates age, older events appearing more transparent, while newer events appear opaque. The time-lapse view therefore shows higher-order temporal patterns in addition to managing the commonly long time scales which may present in memory reference trace data 122.

A "default" history length may be predefined and applied to execution of the cache simulation and to the update of memory utilization graphic 402 unless and until the user selects a different history length. For example, a "default" history length selector 714 of "two" is included in the plurality of tail length selectors 710 presented in seventh user interface window 700. The user may scroll up or down to select a smaller or a longer history length. For example, to show no history, the user may select a "no tail" selector 716 from seventh user interface window 700. The history length indicates the number of past memory access events to continue to show in memory utilization graphic 402. Any number of history lengths may be user selectable. Additionally, other methods for selecting the history length may be used. For example, a drop down box or data entry box may be used to allow the user to select a history length as understood by a person of skill in the art.

In an operation 212, a seventh indicator is received indicating that the user of memory utilization application 118 has selected play selector 702. In response, in operation 214, memory utilization application 118 executes a cache simulation. In operation 216, a determination is made concerning whether or not memory has been accessed during execution of the cache simulation. If memory has not been accessed, processing continues at operation 214 in executing the cache simulation. If memory has been accessed, processing continues at an operation 218. In operation 218, memory allocation information is updated based on the memory accessed. For example, with reference to FIG. 9, operations associated with updating the memory allocation information are described. In operation 220, memory utilization graphic 402 is updated to visually describe the memory access event. For example, with reference to FIG. 10, operations associated with updating memory utilization graphic 402 are described.

Figure 8:
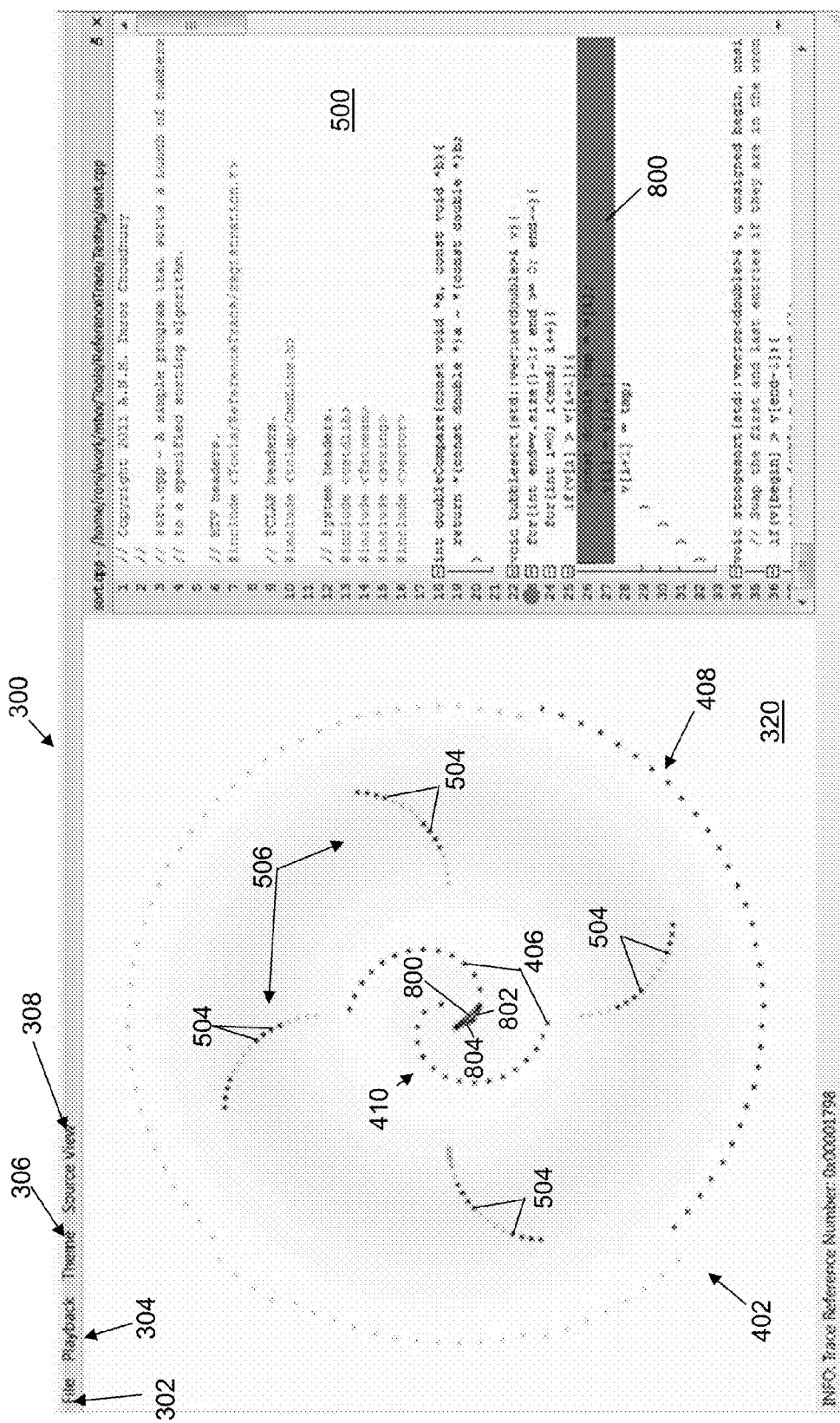

Processing continues at operation 214 in executing the cache simulation and successively updating the memory allocation information and memory utilization graphic 402 when a memory access event occurs. For example, with reference to FIG. 8, source file window 500 is updated to indicate a source execution indicator 800, which indicates the line or lines of source code currently being executed. With reference to FIG. 8, memory utilization graphic 402 has been updated in visualization window 320 to show the memory access events simulated using the information included in memory reference trace data 122. For example, memory utilization graphic 402 has been updated to show a memory move event from a first location in L1 cache to a second location in L1 cache by drawing a first line 800 between a third memory glyph and a first memory glyph of the second plurality of point glyphs 406. The first location in L1 cache indicates the current memory storage location of the data item, which is now ready for access by processor 110 from the L1 cache as simulated using the cache simulation. The second location in L1 cache indicates the memory storage location accessible by processor 110. A second line 802 indicates movement of the content of the data item stored in a third location in L1 cache to the first location, and a third line 804 indicates movement of the content of the second location in L1 cache to the third location in L1 cache. Thus, the first three storage locations of the L1 cache have been resorted based on the data item currently ready for access by processor 110 from the L1 cache as simulated using the cache simulation.

Figure 9:
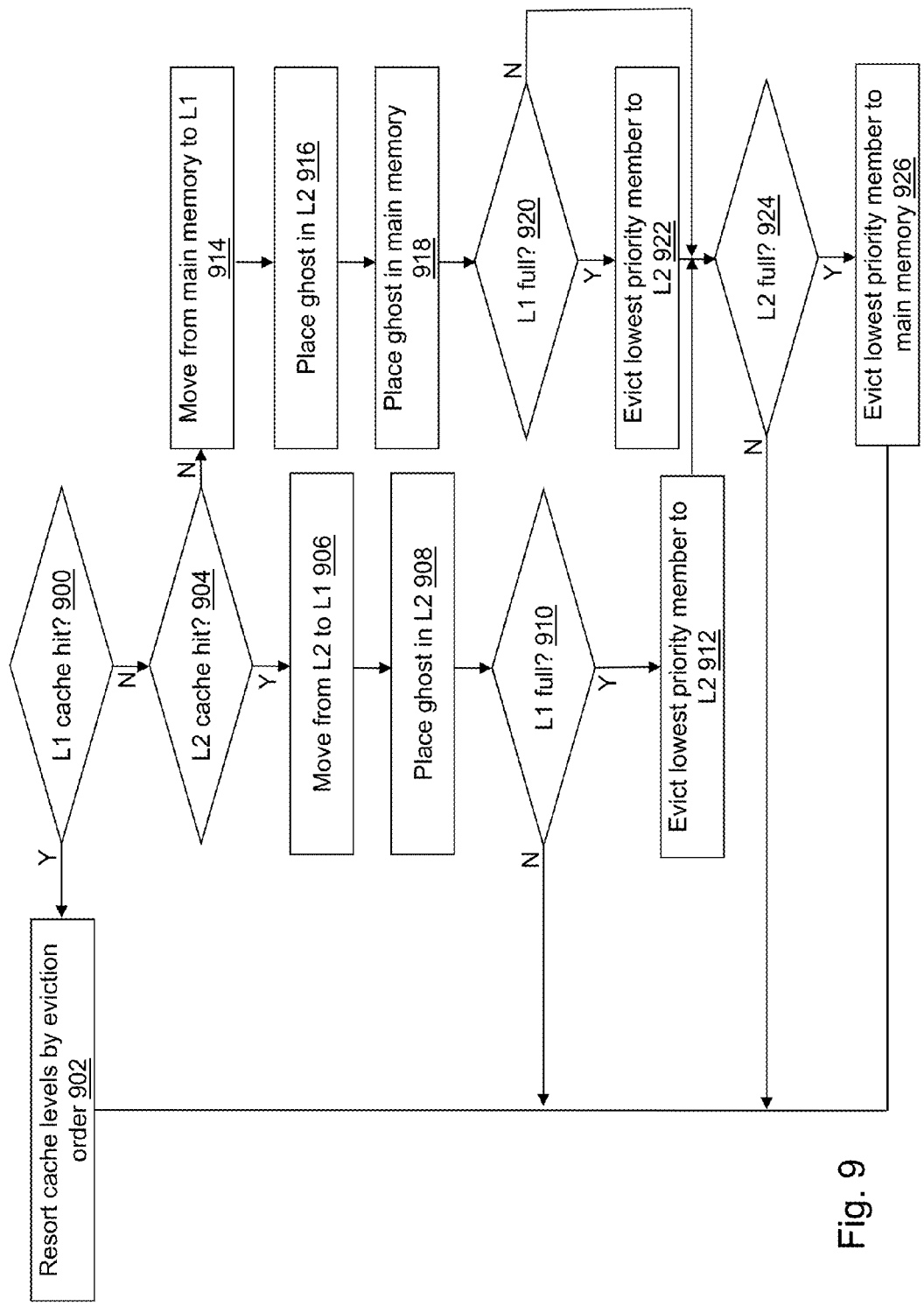
FIG. 9 depicts a flow diagram illustrating example operations performed by the computing device of FIG. 1 to simulate the memory utilization by the test application in accordance with an illustrative embodiment.

With reference to FIG. 9, example operations associated with the update of the memory allocation information are described. Additional, fewer, or different operations may be performed depending on the embodiment. The order of presentation of the operations of FIG. 9 is not intended to be limiting. Thus, although some of the operational flows are presented in sequence, the various operations may be performed in various repetitions, concurrently, and/or in other orders than those that are illustrated. In an operation 900, a determination is made concerning whether or not a L1 cache hit has occurred. For example, during execution of the cache simulation for the current simulation step, a L1 cache hit occurs when the data item ready for access by processor 110 is found in L1 cache. As an example, a portion of the main memory address for the data item ready for access by processor 110 is compared to the tags associated with the data items currently stored in the L1 cache. If a match is found, a L1 cache hit has occurred; otherwise, a L1 cache miss has occurred. If a L1 cache hit has occurred, processing continue in an operation 902. If a L1 cache hit has not occurred, processing continue in an operation 904. In operation 902, the L1 cache is resorted, for example, as described with reference to FIG. 8 with the least frequently used data items moving outward away from the center of memory utilization graphic 402 and toward the next "ring" of memory.

In operation 904, a determination is made concerning whether or not a L2 cache hit has occurred. For example, during execution of the cache simulation for the current simulation step, a L2 cache hit occurs when the data item ready for access by processor 110 is found in L2 cache. As an example, a portion of the main memory address for the data item ready for access by processor 110 is compared to the tags associated with the data items currently stored in the L2 cache. If a match is found, a L2 cache hit has occurred; otherwise, a L2 cache miss has occurred. If a L2 cache hit has occurred, processing continue in an operation 906. If a L2 cache hit has not occurred, processing continue in an operation 914.

In operation 906, the data item is moved from its storage location in L2 cache to the second location in L1 cache where the data item is ready for access by processor 110. In operation 908, a ghost is placed in the storage location in L2 cache of the data item. A ghost is a placeholder for data which exists in a higher memory level, but also occupies space in the current level. Using an inclusive cache architecture, data in L1 cache has a copy in L2 cache and in main memory. In contrast, using an exclusive cache architecture, data is moved from L2 cache to L1 cache leaving an empty slot in L2 cache. Thus, using an exclusive cache architecture, there is no duplication between cache levels although data remains in main memory. As a result, if an exclusive cache architecture is simulated, no ghost is placed in the storage location in L2 cache of the data item.

In operation 910, a determination is made concerning whether or not the L1 cache is full based on the movement of the data item from the L2 cache to the L1 cache. If the L1 cache is not full, processing continues in operation 902, where the L1 and L2 caches are resorted. If the L1 cache is full, processing continues in an operation 912, where a lowest priority member of the L1 cache is evicted to the L2 cache. Of course, different algorithms may be used to determine which data item member of the L1 cache is the lowest priority member. One popular replacement policy replaces the least recently used entry so the least recently used member of the L1 cache is evicted to the L2 cache in an illustrative embodiment.

Processing continues in an operation 924, where a determination is made concerning whether or not the L2 cache is full based on the movement of the evicted data item from the L1 cache to the L2 cache. If the L2 cache is not full, processing continue in operation 902, where the L1 and L2 caches are resorted. If the L2 cache is full, processing continue in an operation 926, where a lowest priority member of the L2 cache is evicted to the next level of cache or to main memory. Of course, different algorithms may be used to determine which data item member of the L1 cache is the lowest priority member. One popular replacement policy replaces the least recently used entry so the least recently used member of the L1 cache is evicted to the L2 cache in an illustrative embodiment. Processing continues in operation 902, where the L1 and L2 caches are resorted after the eviction from the L2 cache.

In operation 914, the data item ready for access by processor 110 is moved from its storage location in main memory (or the next higher cache level if there are additional cache levels and the data item is found in the cache level) to the second location in L1 cache where the data item is ready for access by processor 110. In an operation 916, a ghost is placed in the storage location in L2 cache. Again, if an exclusive cache architecture is simulated, no ghost is placed in the storage location in L2 cache of the data item. In an operation 918, a ghost is placed in the storage location of the data item in main memory. In operation 920, a determination is made concerning whether or not the L1 cache is full based on the movement of the data item from the main memory to the L1 cache. If the L1 cache is not full, processing continues in operation 924. If the L1 cache is full, processing continue in an operation 922, where a lowest priority member of the L1 cache is evicted to the L2 cache. Processing continues in operation 924.

Figure 10:
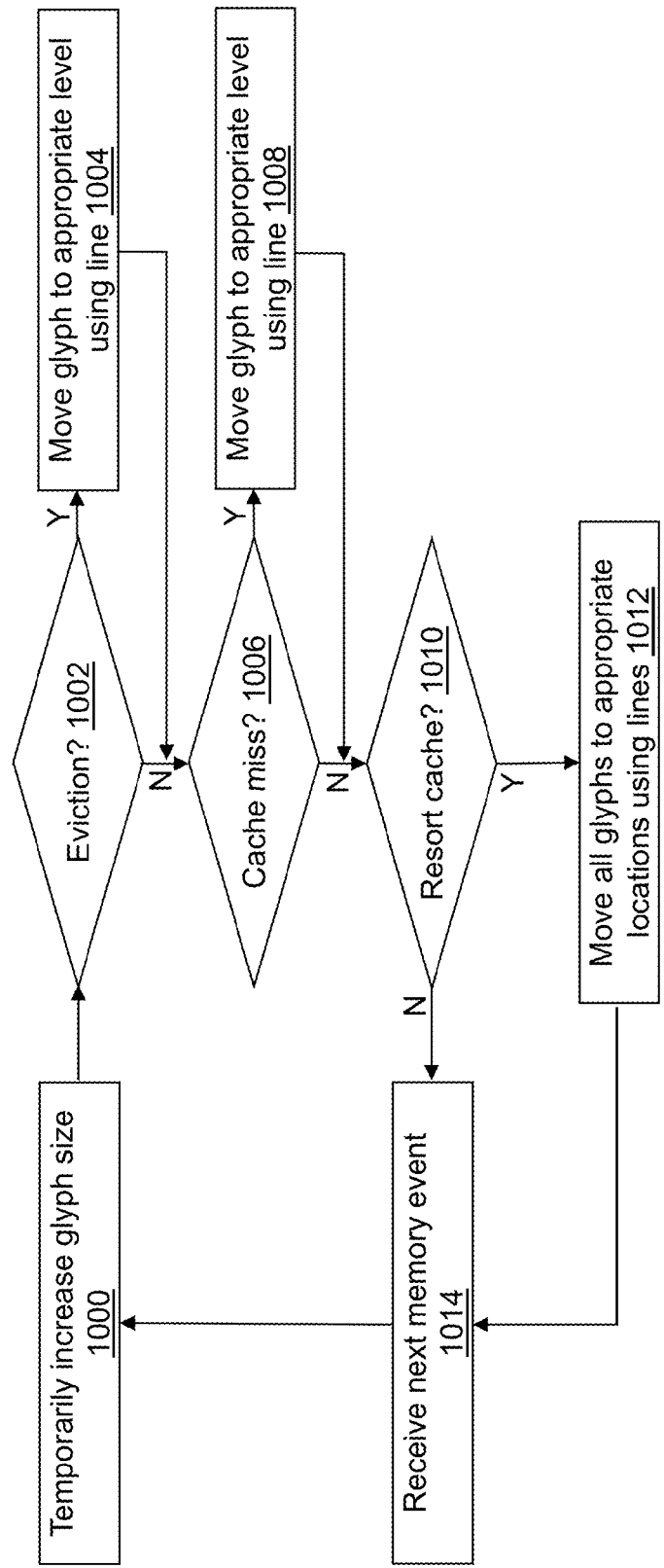
FIG. 10 depicts a flow diagram illustrating example operations performed by the computing device of FIG. 1 to update the visualization of the memory utilization by the test application in accordance with an illustrative embodiment.

With reference to FIG. 10, example operations associated with the update of memory utilization graphic 402 are described. Additional, fewer, or different operations may be performed depending on the embodiment. The order of presentation of the operations of FIG. 10 is not intended to be limiting. Thus, although some of the operational flows are presented in sequence, the various operations may be performed in various repetitions, concurrently, and/or in other orders than those that are illustrated. In an operation 1000, a glyph size associated with a data item storage location for the data item identified as ready for access by processor 110 is temporarily increased in size so that the user can visualize where in the cache or main memory the current data item is stored. The duration of the temporary size increase is selected as long enough for a user to visibly discern the memory location and may be a user selectable number of seconds or fractions of a second. For example, the selected playback speed can be used to vary the real time duration of the temporary size increase of the glyph.

In an illustrative embodiment, each glyphs of the plurality of glyphs of each memory level has the same baseline size to emphasize the relative composition of the cache levels without singling out any particular data items. When a data item is accessed, it pulses larger momentarily, with the effect of highlighting it among all the data items present in the cache level along with it.

Figure 12:
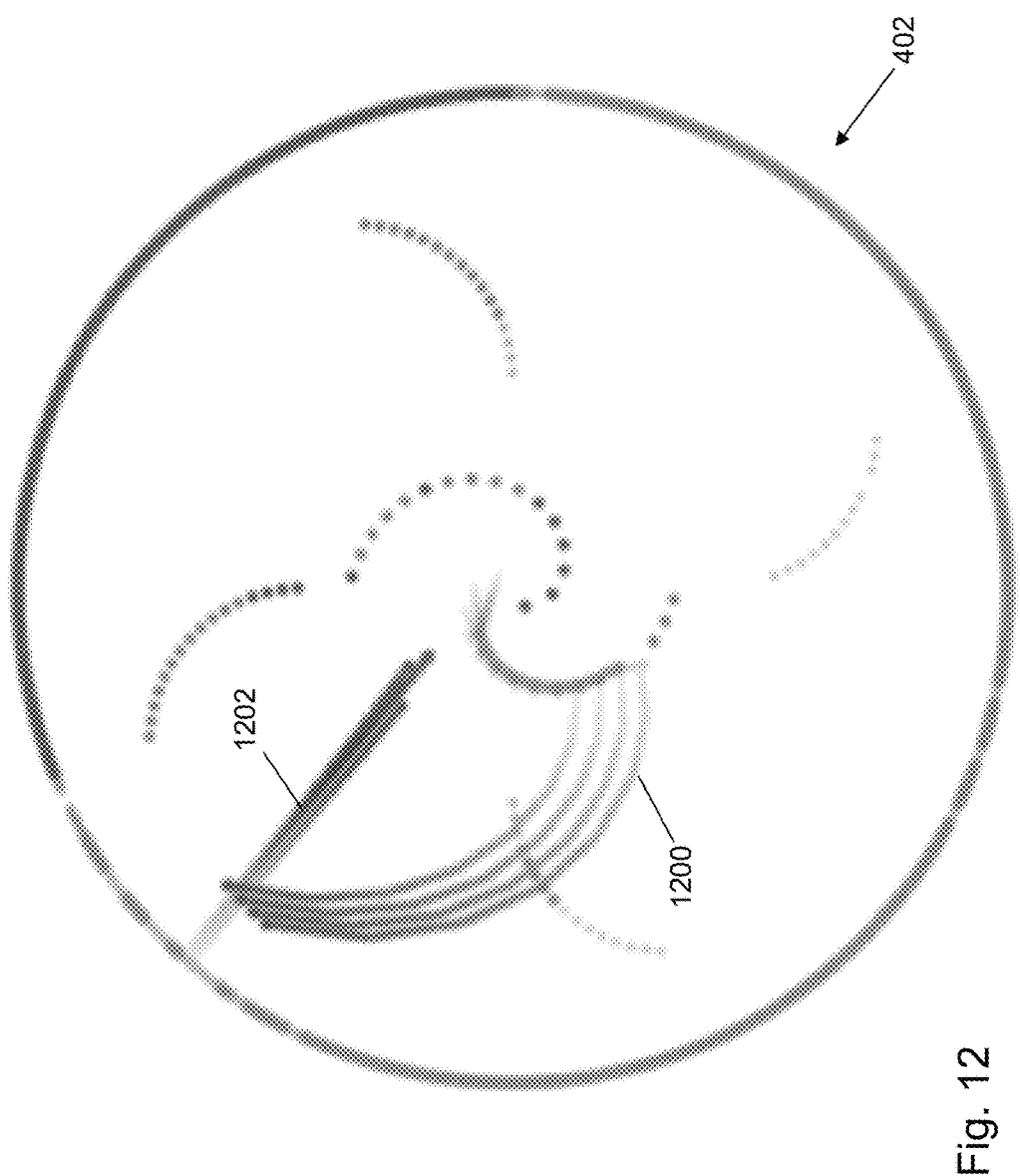

In an operation 1002, a determination is made concerning whether or not there was an eviction event of a data item from a first cache level to a next cache level or to main memory. If an eviction event has occurred, processing continues in an operation 1004. If an eviction event has not occurred, processing continues in an operation 1006. In operation 1004, a line is drawn connecting the cache level from which the eviction has occurred to the cache level to which the evicted data item is moved. In an illustrative embodiment, the eviction line is curved and extends between a first memory glyph in the cache level from which the eviction has occurred to a second memory glyph in the cache level to which the evicted data item is moved as shown with reference to curved line 1200 of FIG. 12. In general, the eviction order is such that older items are moved successively outward away from the center of memory utilization graphic 402.

In operation 1006, a determination is made concerning whether or not there was a cache miss. If a cache miss has occurred, processing continues in an operation 1008. If a cache miss has not occurred, processing continues in an operation 1010. In operation 1008, a line is drawn connecting the cache level from which the data item is moved and the first memory glyph of the second plurality of point glyphs 406 indicating the location to which the data item is moved. In an illustrative embodiment, the cache miss line is straight and extends between a first memory glyph in the cache level at which the cache miss occurred to the first memory glyph of the second plurality of point glyphs 406 as shown with reference to straight line 1202 of FIG. 12.

In an illustrative embodiment, each glyph's color may be selected to reflect the region of memory it comes from. For example, several arrays of data from a particle simulation, each containing a certain type of simulation value (mass, velocity, etc.) may be distinguishable using a color that is reflected as the data from each array moves between the different levels of memory. As glyphs move to the L1 cache in response to a cache miss event, the glyph may flash red momentarily to indicate their involvement in the cache miss event.

When the data item is not already present in the L1 cache, its pulsation can be seen as it moves into the location of the first memory glyph of the second plurality of point glyphs 406 in response to the cache miss event. For example, the line may pulse in a shade of red. Because the same amount of time is allotted for each move event, larger distances may be covered at a higher velocity than shorter ones. Important events such as cache misses and evictions appear as visually striking, higher velocity actions than do cache hits. When a flurry of such events occurs, the effect is a jumble of high-speed activity which appears very clearly and draws the viewer's attention.

In operation 1010, a determination is made concerning whether or not a cache has been resorted. If a cache has been resorted, processing continues in an operation 1012. If a cache has not been resorted, processing continues in an operation 1014. In operation 1012, a line is drawn indicating the movement of the data items within and the plurality of glyphs associated with the resorted cache level. For example, with reference to FIG. 8, a partial resort of the L1 cache was described previously. In an illustrative embodiment, the cache resort line is straight and extends between a first memory glyph and a second memory glyph of the cache level being resorted. In an operation 1014, an indicator of a next memory event is received and processing continues at operation 1000 to update memory utilization graphic 402 appropriately based on the indicated memory utilization.

Within a particular cache level, slower motions to the head of the cache set indicates a cache hit. With many cache hits occurring in a row, the visual character is that of several glyphs vying for the head position in the cache. The volume of activity is again expressed by volume of motion, but the short distances involved serve as a visual reminder that the observed behavior exhibits good locality. Glyphs cover long distances quickly only when they are evicted from one cache level and enter another—a momentary state change that occurs locally in time. Data entering the cache (in response to a cache miss) can be distinguished from data leaving the cache (due to eviction) because the former may be expressed by fast, straight-line motion, while in the latter, glyphs move in a wider circular motion to suggest fleeing. Data items with poor utilization slowly migrate to the outer edge of their home cache level, and are evicted by incoming data items at the appropriate time to a farther cache level. By watching this slowly developing positional change, one may learn about the effect of under-utilization of these data items.

Figure 11:
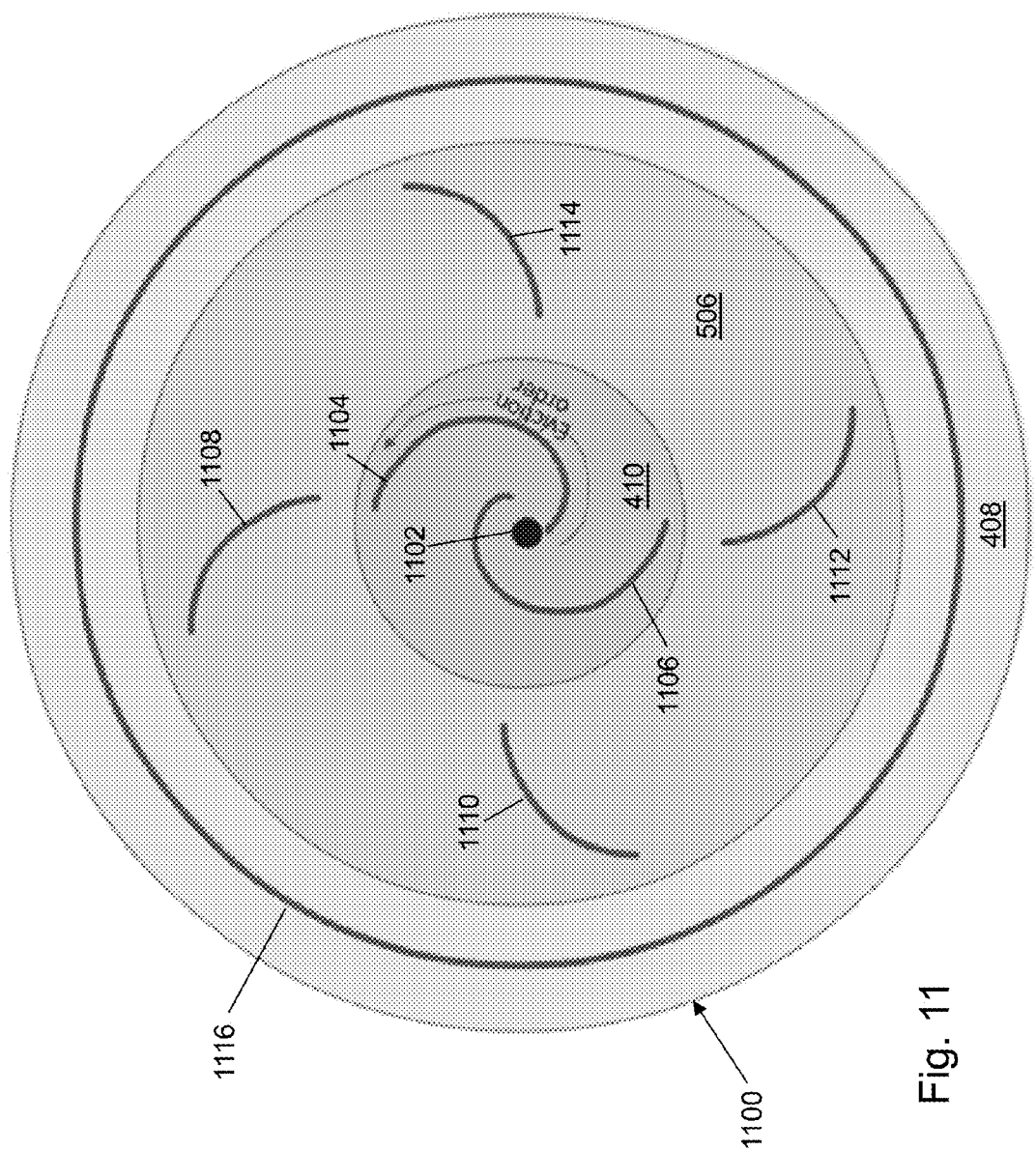
FIG. 11 depicts a visualization layout in accordance with an illustrative embodiment.

With reference to FIG. 11, a visualization layout 1100 is shown in accordance with an illustrative embodiment. Visualization layout 1100 includes outer ring 408, innermost ring 410, and first intermediate ring 506, which form concentric rings. As discussed previously, the access speed of the memory level associated with each ring increases such that the fastest memory access speed level is associated with innermost ring 410, and the slowest memory access speed level is associated with outer ring 408. One or more intermediate rings indicate intermediate access speeds. The center of visualization layout 1100 indicates a first memory location glyph 1102 which is the first memory glyph of the second plurality of point glyphs 406 that is ready for access by processor 110. Thus, first memory location glyph 1102 represents the CPU with its registers.

Data items are indicated by first memory location glyph 1102 when the data item is ready for access by processor 110, for example, for use in a calculation to be performed with that data item as test application 120 is executed. As described previously, the second plurality of point glyphs 406 form a first spiral 1104 and a second spiral 1106. Depending on the size of the L1 cache and the resolution of display 112, the glyphs which make up the second plurality of point glyphs 406 may appear to be discrete as shown in FIGS. 4, 5a, 6, 7, and 8 or continuous as shown in visualization layout 1100. For example, each memory item may receive one glyph. If the number of memory items is large, glyphs overlap and eventually occlude one another though the movement between memory levels remains visible. As the L1 cache is resorted, data items are evicted in an order moving towards the edge of each of first spiral 1104 and second spiral 1106. First spiral 1104 and second spiral 1106 indicate cache level associativity. To make caches even faster, the data items within a cache level are subdivided into what are known as associative sets. Any number of associative sets may be used in a cache. However one-way (i.e. fully associative), two-way, four-way, and eight-way are the most common. In the illustrative embodiment, the L1 cache is two-way associative and the L2 cache is four-way associative. Data blocks are placed into the available associative sets based upon their address. Consecutive data blocks alternate in which associative set they are stored. For example, in the two-way cache of the L1 cache, block 0 goes to set 0, block 1 goes to set 1, block 2 goes to set 0, and block 3 goes to set 1, etc.

As described previously, the third plurality of point glyphs 504 form a first arc 1108, a second arc 1110, a third arc 1112, and a fourth arc 1114. Depending on the size of the L2 cache and the resolution of display 112, the glyphs which make up the third plurality of point glyphs 504 may appear to be discrete as shown in FIGS. 4, 5a, 6, 7, and 8 or continuous as shown in visualization layout 1100. In the illustrative embodiment, block 0 goes to set 0 or first arc 1108, block 1 goes to set 1 or second arc 1110, block 2 goes to set 2 or third arc 1112, block 3 goes to set 3 or fourth arc 1114, and block 4 goes to set 0 or first arc 1108, etc. While the associative sets of L1 cache and L2 cache are not directly related to one another, blocks that go into L2 cache associative sets 0 and 2 also go into L1 cache associative set 0. Similarly, L2 cache associative sets 1 and 3 go into L1 cache associative set 1.

As described previously, the first plurality of point glyphs 404 form a circle 1116. Depending on the size of main memory and the resolution of display 112, the glyphs which make up the first plurality of point glyphs 404 may appear to be discrete as shown in FIGS. 4, 5*a*, 6, 7, and 8 or continuous as shown in visualization layout 1100. In an illustrative embodiment, color may be associated with specific blocks of memory. For example, debugging symbols provide an address range for a particular variable and each variable may be assigned a unique color from a color palette. If more variables exist than available colors, the colors are repeated. In this way, the movement of data associated with specific data variables can be visualized.

To further visually describe memory utilization, outer ring 408, innermost ring 410, and first intermediate ring 506 may be filled with a color representing the activity associated with the particular memory level. For example, if the L2 cache is currently being accessed extensively, first intermediate ring 506 may be colored a shade of red; whereas, if the L2 cache is not currently being accessed extensively, first intermediate ring 506 may be colored a shade of blue. Thus, visualization layout 1100 also provides for displaying a general quantity computed from memory reference trace data 122 as a whole, allowing, for example, statistical information about the trace to be included in display 112. A computed value may be displayed in a soft, color mapped disk behind the rings reserved for each cache level. The computed value may be associated with the "cache temperature", which is a measure of the proportion of transactions in each cache level resulting in a hit. More precisely, each reference trace record causes a change in the cache: each level may either hit, miss, or else be uninvolved in the transaction. These are assigned scores (a negative value for a miss, a positive value for a hit, and zero for noninvolvement), which are averaged over the last N reference trace records. The assigned scores may vary for different levels; for example, the penalty for a miss is higher for the L1 cache, because once a cache line is loaded into L1, it will have more of a chance to make heavy reuse of the data than a slower level would. In each level, the cache temperature rises above zero when the volume of data reuse exceeds the "break even" point, and falls below zero when there is not enough reuse. When a cache level sits idle (because, for instance, faster levels are hitting at a high rate), its temperature gradually drifts back to zero. The metaphor is that new data are cold, causing a drop in temperature, but accessing resident data releases energy and raises the temperature. Between these extremes, sitting idle allows for the temperature to return slowly to a neutral point.

The cache temperature may be displayed as a glowing color behind the structural elements of each ring of visualization layout 1100. In an illustrative embodiment, a white color indicates no activity or a balance of hits and misses, red indicates a relatively high volume of cache hits, and blue indicates a relatively high volume of misses. The cache temperature glyphs provide a context for the patterns of activity that occur over it. When the respective cache is warm, the pattern of activity generally shows frequent data reuse, while there may be many patterns to explain a cold cache. The changing temperature colors help to highlight periods of activity leading to both kinds of cache behavior.

Figure 13:
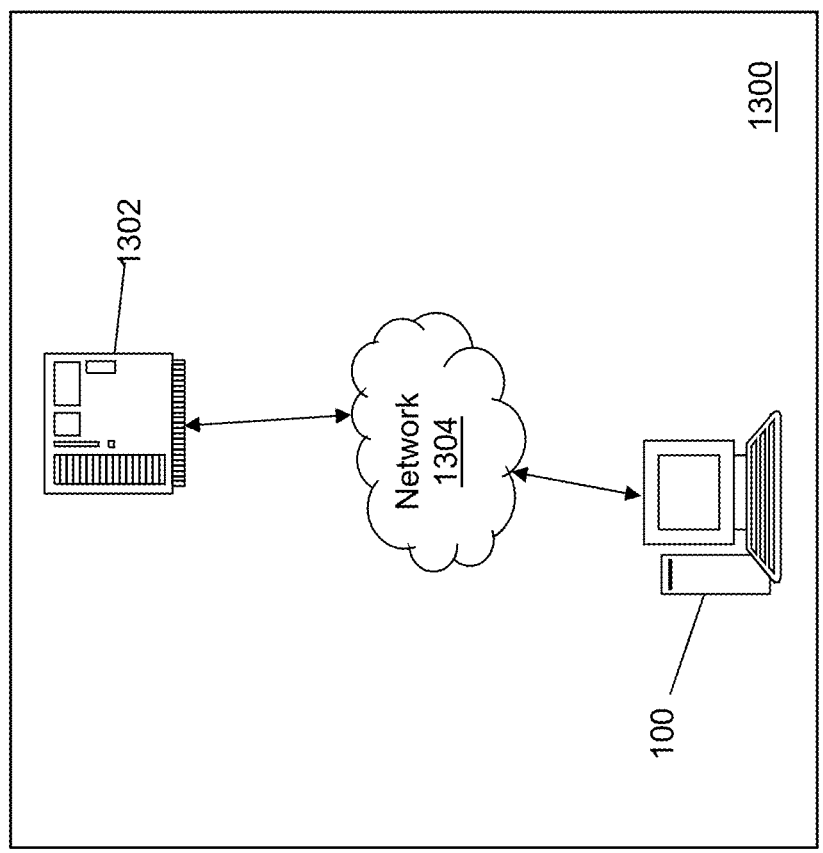
FIG. 13 depicts a block diagram of a memory utilization visualization system in accordance with an illustrative embodiment.

With reference to FIG. 13, a block diagram of a memory utilization visualization system 1300 is shown in accordance with an illustrative embodiment. In an illustrative embodiment, memory utilization visualization system 1300 may include a server computing device 1302, computing device 100, and a network 1304. Network 1304 may include one or more networks of the same or different types. Network 1304 can be any type of wired and/or wireless public or private network including a cellular network, a local area network, a wide area network such as the Internet, etc. Network 1304 further may be comprised of sub-networks and consist of any number of devices. Computing device 100 may communicate with server computing device 1302 through communication interface 108 and network 1304. For example, test application 120 and/or memory reference trace data 122 may be stored on server computing device 1302 for access by computing device 100. The components of memory utilization visualization system 1300 may be positioned in a single location, a single facility, and/or may be remote from one another.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computing device to implement the disclosed embodiments.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A non-transitory computer-readable medium having stored thereon computer-readable instructions to create a visualization of memory during execution of a test application that when executed by a processor cause a computing device to:

open a data file identified by a user that includes memory reference trace data describing memory usage of a plurality of memories including a first memory and a second memory accessed by the processor during the execution of the test application, wherein a first access speed for accessing the first memory by the processor is faster than a second access speed for accessing the second memory by the processor;

read the opened data file to define first data currently stored in the first memory and to define second data currently stored in the second memory;

receive a user command to begin visualizing memory usage by the test application based on the read data file for a selected length of time and responsive to the received command;

present a user interface window in a display of the computing device that includes a plurality of first glyphs arranged in one or more arcs that represent the first data and a plurality of second glyphs arranged in a circle outside the arcs that represent the second data, wherein a position of each glyph of the first plurality of glyphs and of the second plurality of glyphs indicates an addressable memory location in the respective first memory and second memory of the respective first data and second data;

present a source file window in the display, wherein the source file window includes instructions associated with execution of a source file of the test application, wherein the source file window indicates an executing instruction;

update the user interface window to show movement of data between memory locations based on the executing instruction;

receive an indicator of selection of a particular instruction presented in the source file window;

identify a position in the data file for a memory event associated with the particular instruction;

read a next memory event from the opened data file, the next memory event associated with the particular instruction;

determine a datum to be read by the processor from the next memory event, the datum to be read from the first memory;

determine that the datum is not stored in the first memory and that the datum is stored in the second memory;

determine a first glyph from the plurality of first glyphs that represents a location of the datum to be read from the first memory;

determine a second glyph from the plurality of second glyphs that represents a location of the datum stored in the second memory;

update the user interface window by drawing a line from the second glyph to the first glyph, the line representative of the movement of the datum from the second memory to the first memory during the execution of the test application.

2. The computer-readable medium of claim 1, wherein each arc of the one or more arcs forms at least a portion of one or more second circles.

3. The computer-readable medium of claim 2, wherein the one or more respective second circles are not concentric with the circle.

4. The computer-readable medium of claim 2, wherein a radius of the one or more respective second circles is smaller than a radius of the circle.

5. The computer-readable medium of claim 1, wherein the user interface window further includes a plurality of third glyphs representing third data that is currently stored in a third memory, wherein the plurality of third glyphs are presented in the user interface window to form one or more spirals within the circle and close to a center of the circle than the one or more arcs, wherein a third access speed for accessing the third memory by the processor is faster than the second access speed for accessing the second memory by the processor, and further wherein the third access speed for accessing the third memory by the processor is faster than the first access speed for accessing the first memory by the processor.

6. The computer-readable medium of claim 1, wherein the first memory comprises a level 1 cache and the second memory is selected from the group consisting of a level 2 cache, a level 3 cache, a main memory, and an external memory removable from the computing device without a tool.

7. The computer-readable medium of claim 1, wherein the first glyph further represents an addressable memory location in which the first datum is stored in the first memory.

8. The computer-readable medium of claim 1, wherein locations of the plurality of first glyphs and locations of the plurality of second glyphs are defined from the read memory reference trace data stored in the data file.

9. The computer-readable medium of claim 1, wherein the computer-readable instructions further cause the computing device to update the plurality of first glyphs and the plurality of second glyphs as the memory reference trace data is read from the data file to simulate memory usage of the test application during execution, wherein a speed of the update is selectable by a user.

10. The computer-readable medium of claim 1, wherein, when the next memory event is read from the data file, a glyph of the plurality of first glyphs or of the plurality of second glyphs that is associated with a memory address of the next memory event is at least one of increased in size, flashed on and off, and changed in color.

11. The computer-readable medium of claim 1, wherein the computer-readable instructions further cause the computing device to read another next memory event from the opened data file, determine that a memory address associated with the read another next memory event is in the first memory, and draw a line between a glyph of the plurality of first glyphs associated with the memory address and a center of the circle.

12. The computer-readable medium of claim 10, wherein, if the memory address is in the first memory, the computer-readable instructions further cause the computing device to resort the plurality of first glyphs based on an access time associated with each memory location of the first memory and to draw a line between the plurality of first glyphs to indicate the resorting of the first memory.

13. The computer-readable medium of claim 10, wherein, if the memory address associated with the memory event is in the second memory, the glyph is one of the plurality of second glyphs and the computer-readable instructions further cause the computing device to draw a line between the glyph and a center of the first circle.

14. The computer-readable medium of claim 1, wherein the computer-readable instructions further cause the computing device to update the plurality of first glyphs and the plurality of second glyphs in the user interface window as the memory reference trace data is read from the data file to simulate memory usage of the test application during execution, wherein a history length can be selected by a user, wherein the history length indicates a number of past memory events to maintain in the user interface window.

15. The computer-readable medium of claim 1, wherein each glyph associated with an addressable memory location of the first memory and the second memory has a relative priority, wherein the computer-readable instructions further cause the computing device to draw a second line between a lowest priority glyph of the plurality of first glyphs to a highest priority glyph of the plurality of second glyphs to indicate movement of an evicted datum associated with the lowest priority glyph from the first memory to the second memory when it is determined that the first memory is full.

16. The computer-readable medium of claim 1, wherein the computer-readable instructions further cause the computing device to resort the plurality of second glyphs based on an access time associated with each memory location of the second memory and to draw second lines between the plurality of second glyphs to indicate the resorting of the second memory.

17. A method of visualizing memory utilization by a computing device during execution of a test application, the method comprising:

opening a data file identified by a user that includes memory reference trace data describing memory usage of a plurality of memories including a first memory and a second memory accessed by a processor during the execution of the test application, wherein a first access speed for accessing the first memory by the processor is faster than a second access speed for accessing the second memory by the processor;

reading the opened data file to define first data currently stored in the first memory and to define second data currently stored in the second memory;

receiving a user command to begin visualizing the data file for a selected length of time and responsive to the received command;

presenting a user interface window in a display of the computing device, that includes a plurality of first glyphs arranged in one or more arcs that represent the first data and a plurality of second glyphs arranged in a circle outside the arcs that represent the second data, wherein a position of each glyph of the first plurality of glyphs and of the second plurality of glyphs indicates an addressable memory location in the respective first memory and second memory of the respective first data and second data;

presenting a source file window in the display, wherein the source file window includes instructions associated with execution of a source file of the test application, wherein the source file window indicates an executing instruction;

updating the user interface window to show movement of data between memory locations based on the executing instruction;

receiving an indicator of selection of a particular instruction presented in the source file window;

identifying, by the computing device, a position in the data file for a memory event associated with the particular instruction;

reading a next memory event from the opened data file, the next memory event associated with the particular instruction;

determining, by the computing device, a datum to be read by the processor from the next memory event, the datum to be read from the first memory;

determining, by the computing device, that the datum is not stored in the first memory and that the datum is stored in the second memory;

determining, by the computing device, a first glyph from the plurality of first glyphs that represents a location of the datum to be read from the first memory;

determining, by the computing device, a second glyph from the plurality of second glyphs that represents a location of the datum stored in the second memory; and updating the user interface window by drawing a line from the second glyph to the first glyph, the line representative of the movement of the datum from the second memory to the first memory during the execution of the test application.

18. A non-transitory computer-readable medium having stored thereon computer-readable instructions to create a visualization of memory during execution of a test application that when executed by a processor cause a computing device to open a data file identified by a user that includes memory reference trace data describing memory usage of a plurality of memories including a first memory and a second memory accessed by the processor during the execution of the test application, wherein a first access speed for accessing the first memory by the processor is faster than a second access speed for accessing the second memory by the processor;

read the opened data file to define first data currently stored in the first memory and to define second data currently stored in the second memory;

receive a user command to begin visualizing memory usage by the test application based on the read data file for a selected length of time and responsive to the received command;

present a user interface window in a display of the computing device that includes a plurality of first glyphs arranged in one or more arcs that represent the first data and a plurality of second glyphs arranged in a circle outside the arcs that represent the second data, wherein a position of each glyph of the first plurality of glyphs and of the second plurality of glyphs indicates an addressable memory location in the respective first memory and second memory of the respective first data and second data;

present a source file window in the display, wherein the source file window includes instructions associated with execution of a source file of the test application, wherein the source file window indicates an executing instruction;

update the user interface window to show movement of data between memory locations based on the executing instruction;

receive an indicator of selection of a particular instruction presented in the source file window;

identify a position in the data file for a memory event associated with the particular instruction;

read a next memory event from the opened data file, the next memory event associated with the particular instruction;

determine that a memory address associated with the read next memory event is stored in the second memory;

resort the plurality of first glyphs based on an access time associated with each memory location of the first memory;

draw first lines between the plurality of first glyphs representative of the resorting of the first memory;

resort the plurality of second glyphs based on an access time associated with each memory location of the second memory; and draw second lines between the plurality of second glyphs representative of the resorting of the second memory and, if the first memory is full, draw a second line between a lowest priority glyph of the plurality of first glyphs to a highest priority glyph of the plurality of second glyph representative of movement of the associated datum from the first memory to the second memory.

* * * * *